(12) United States Patent
Hazelton et al.

(10) Patent No.: US 8,201,536 B2
(45) Date of Patent: Jun. 19, 2012

(54) INTAKE SYSTEM WITH RESONATOR

(75) Inventors: Gary J. Hazelton, White Lake, MI (US); Boris D. Stojkovic, Ann Arbor, MI (US)

(73) Assignee: GM Global Technology Operations LLC

( * ) Notice: Subject to any disclaimer, the term of this patent is extended or adjusted under 35 U.S.C. 154(b) by 847 days.

(21) Appl. No.: 12/275,575

(22) Filed: Nov. 21, 2008

(65) Prior Publication Data

US 2009/0194056 A1  Aug. 6, 2009

Related U.S. Application Data

(60) Provisional application No. 61/025,595, filed on Feb. 1, 2008.

(51) Int. Cl.
*F01M 9/10* (2006.01)
*F02M 35/10* (2006.01)

(52) U.S. Cl. ............ 123/184.57; 123/90.38; 123/184.31

(58) Field of Classification Search ........ 123/54.4–54.8, 123/184.31–184.37, 184.53, 184.57, 90.38, 123/195 C See application file for complete search history.

(56) References Cited

U.S. PATENT DOCUMENTS

| 1,761,960 | A | * | 6/1930 | Armitage | 123/184.33 |
| 2,014,371 | A | * | 9/1935 | Barker | 123/184.57 |
| 4,763,612 | A | * | 8/1988 | Iwanami | 123/184.36 |
| 5,109,811 | A | * | 5/1992 | Tanaka et al. | 123/184.53 |
| 2003/0041832 | A1 | | 3/2003 | Kodweiss et al. | |

FOREIGN PATENT DOCUMENTS

DE  4030652 A1 * 4/1992

* cited by examiner

*Primary Examiner* — Noah Kamen
(74) *Attorney, Agent, or Firm* — Harness, Dickey & Pierce, P.L.C.

(57) ABSTRACT

An engine assembly may include an engine block, first and second cylinder heads, and a first and second intake manifolds. The engine block may include a first bank defining a first set of cylinders and a second bank defining a second set of cylinders. The first cylinder head may be fixed to the first bank and the second cylinder head may be fixed to the second bank. The first intake manifold may be fixed to the first cylinder head and may include a first acoustic tuning mechanism in communication with the first intake manifold. The second intake manifold may be fixed to the second cylinder head and may include a second acoustic tuning mechanism in communication with the second intake manifold.

20 Claims, 6 Drawing Sheets

INTAKE SYSTEM WITH RESONATOR

CROSS-REFERENCE TO RELATED APPLICATIONS

This application claims the benefit of U.S. Provisional Application No. 61/025,595, filed on Feb. 1, 2008. The entire disclosure of the above application is incorporated herein by reference.

FIELD

The present disclosure relates to intake manifolds, and more specifically to air pressure pulsations in intake manifolds.

BACKGROUND

The statements in this section merely provide background information related to the present disclosure and may not constitute prior art.

Engine assemblies may include an intake manifold to provide an air flow to cylinders of the engine. Air pressure fluctuation within the intake manifold may result in variation of cylinder air flow.

SUMMARY

An engine assembly may include an engine block, first and second cylinder heads, and first and second intake manifolds. The engine block may include a first bank defining a first set of cylinders and a second bank defining a second set of cylinders. The first cylinder head may be fixed to the first bank and may include a first set of intake ports. The second cylinder head may be fixed to the second bank and may include a second set of intake ports. The first intake manifold may be fixed to the first cylinder head and may include a first air inlet, a first air distribution member in communication with the first air inlet and the first set of intake ports, and a first acoustic tuning mechanism in communication with the first air distribution member that reduces a first air pressure pulsation within the first air distribution member. The second intake manifold may be fixed to the second cylinder head and may include a second air inlet, a second air distribution member in communication with the second air inlet and the second set of intake ports, and a second acoustic tuning mechanism in communication with the second air distribution member that reduces a second air pressure pulsation within the second air distribution member.

An engine assembly may include an engine block, a first cylinder head, and a first intake manifold. The engine block may include a first bank defining a first set of cylinders having a first a-periodic firing order corresponding to two revolutions of an engine crankshaft. The first cylinder head may be fixed to the first bank and may include a first set of intake ports. The first intake manifold may be fixed to the first cylinder head and may include a first air inlet, a first air distribution member in communication with the first air inlet and the first set of intake ports, and a first acoustic tuning mechanism in communication with the first air distribution member that reduces an air pressure pulsation created by the first a-periodic firing order of the first set of cylinders.

A method may include determining a first air pressure pulsation in a first intake manifold that is fixed to a first cylinder head that corresponds to a first set of cylinders in an engine, determining a second air pressure pulsation in a second intake manifold that is fixed to a second cylinder head that corresponds to a second set of cylinders of the engine, selecting a first acoustic tuning mechanism based on the determined first air pressure pulsation, providing communication between the first intake manifold and the first acoustic tuning mechanism to reduce the first air pressure pulsation, selecting a second acoustic tuning mechanism based on the determined second air pressure pulsation, and providing communication between the second intake manifold and the second acoustic tuning mechanism to reduce the second air pressure pulsation.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
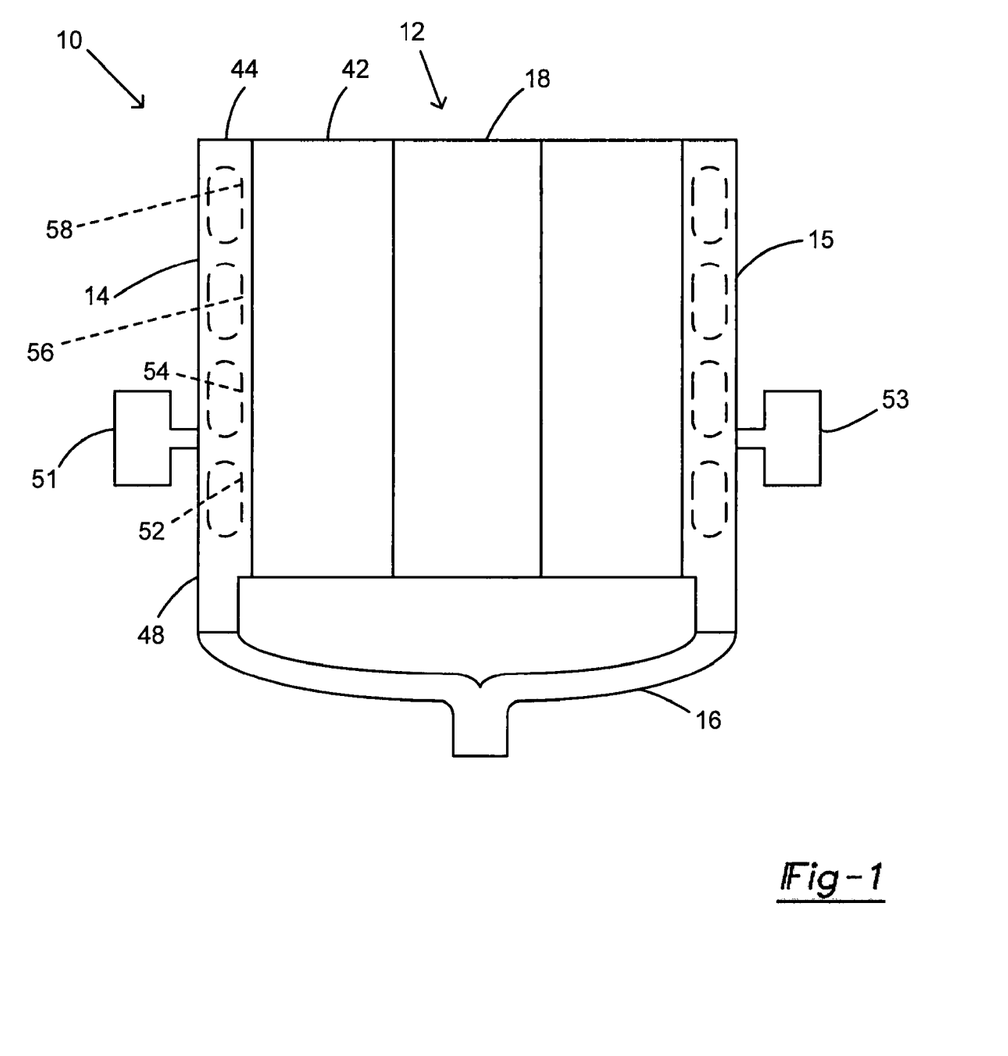
FIG. 1 is a schematic illustration of an engine assembly according to the present disclosure.
Figure 2:
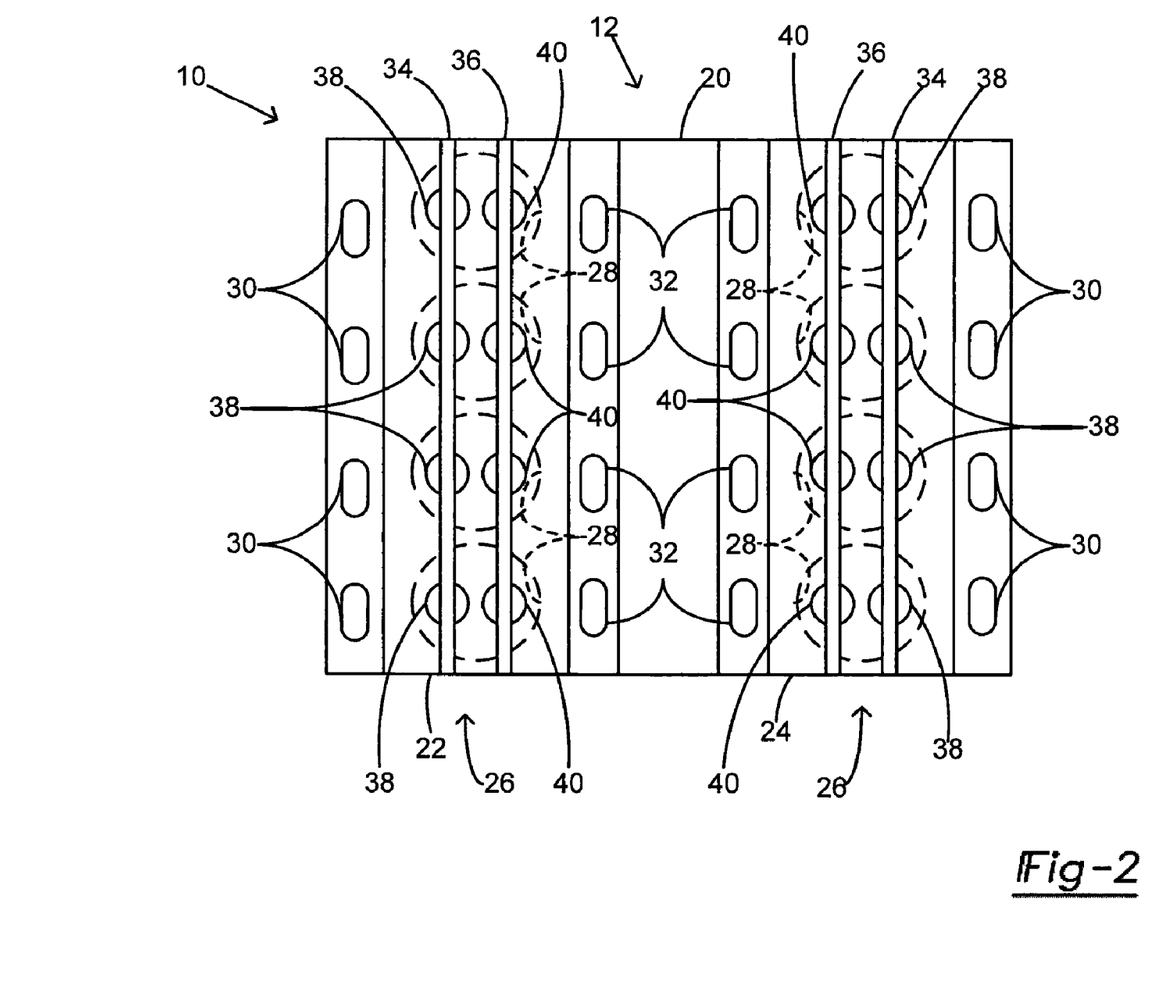
FIG. 2 is an additional schematic illustration of the engine assembly of FIG. 1.
Figure 3:
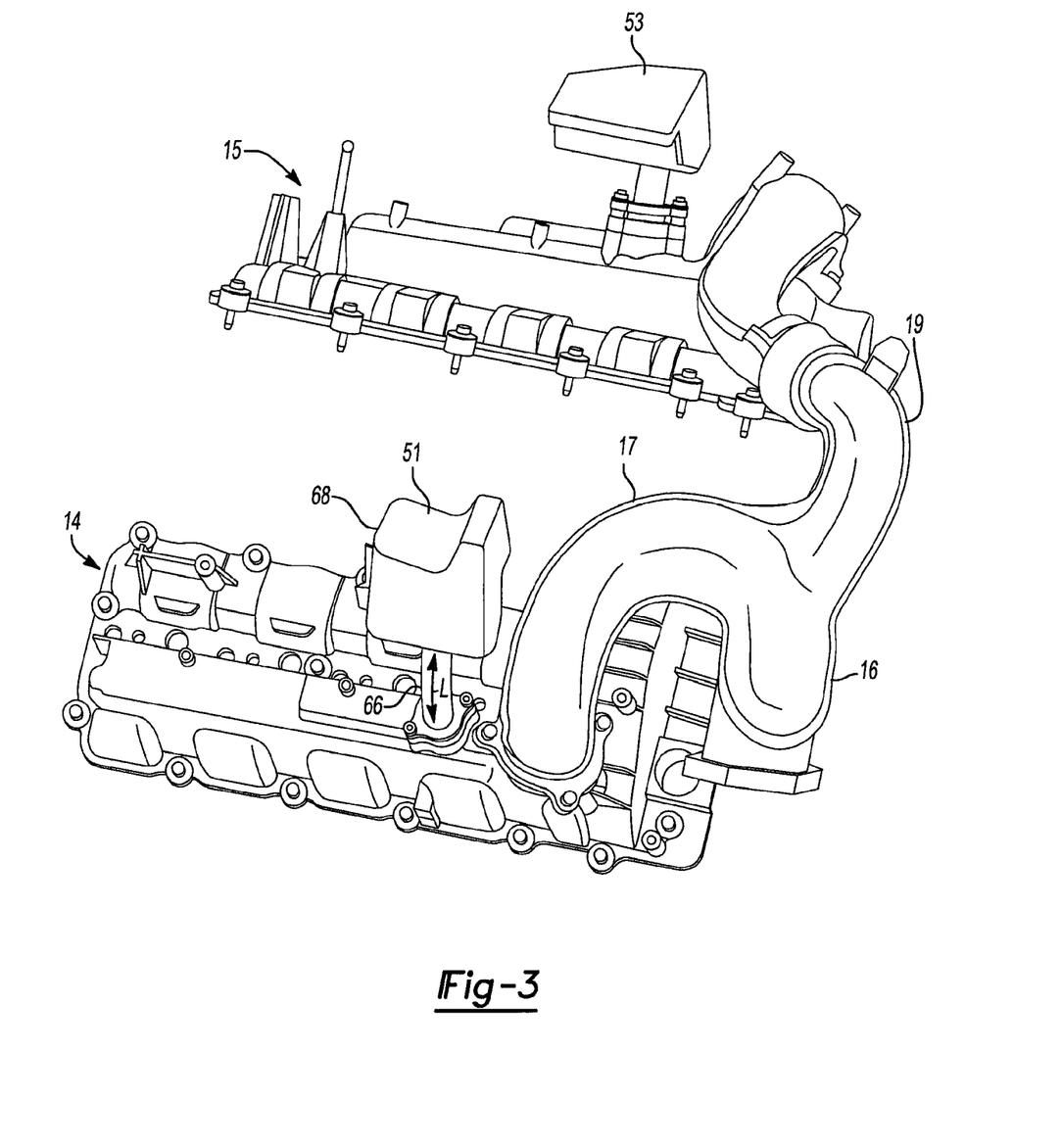
FIG. 3 is a perspective view of an intake system of the engine assembly of FIG. 1.
Figure 4:
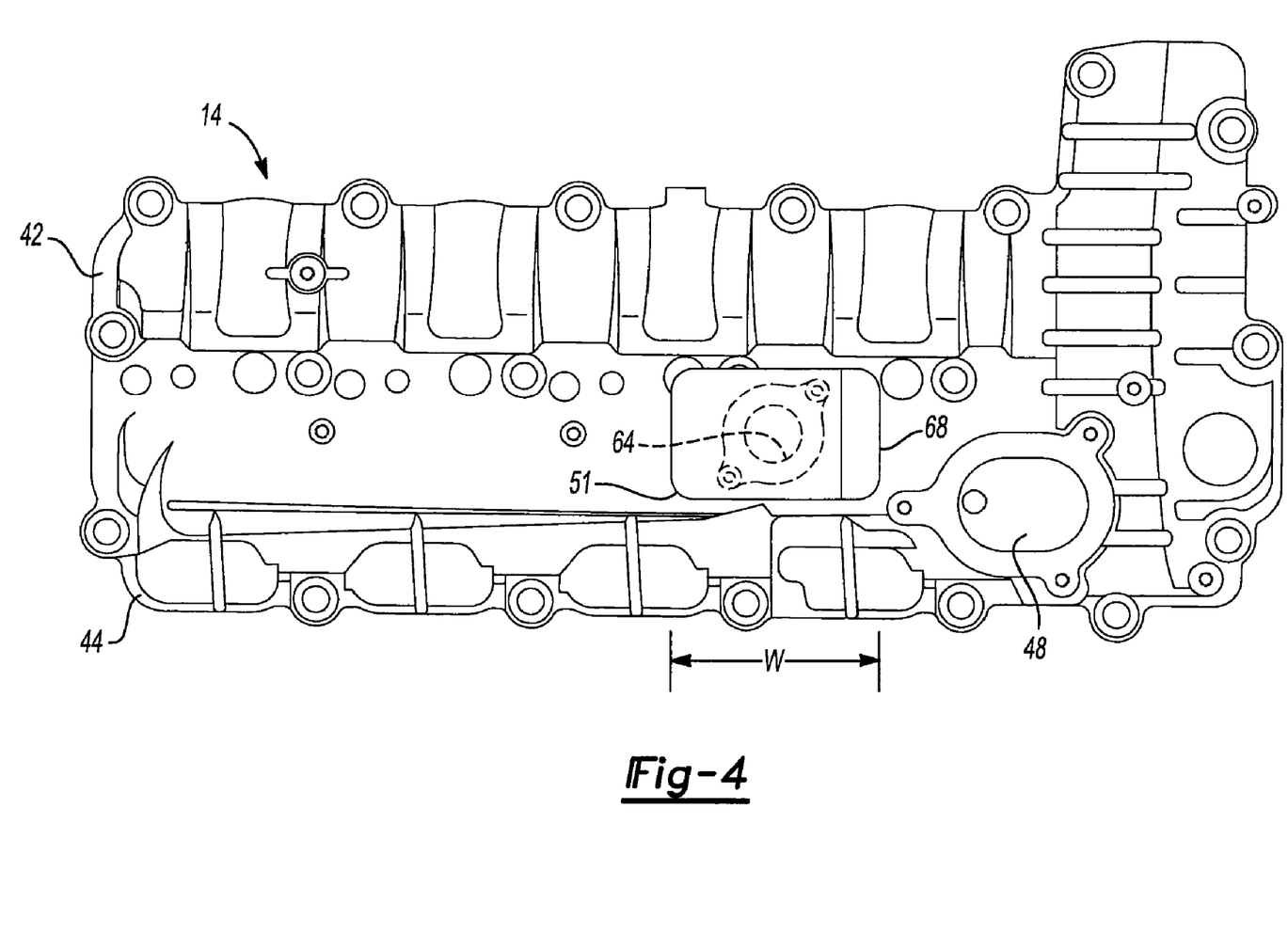
FIG. 4 is a top plan view of the cover member shown in FIG. 1.
Figure 5:
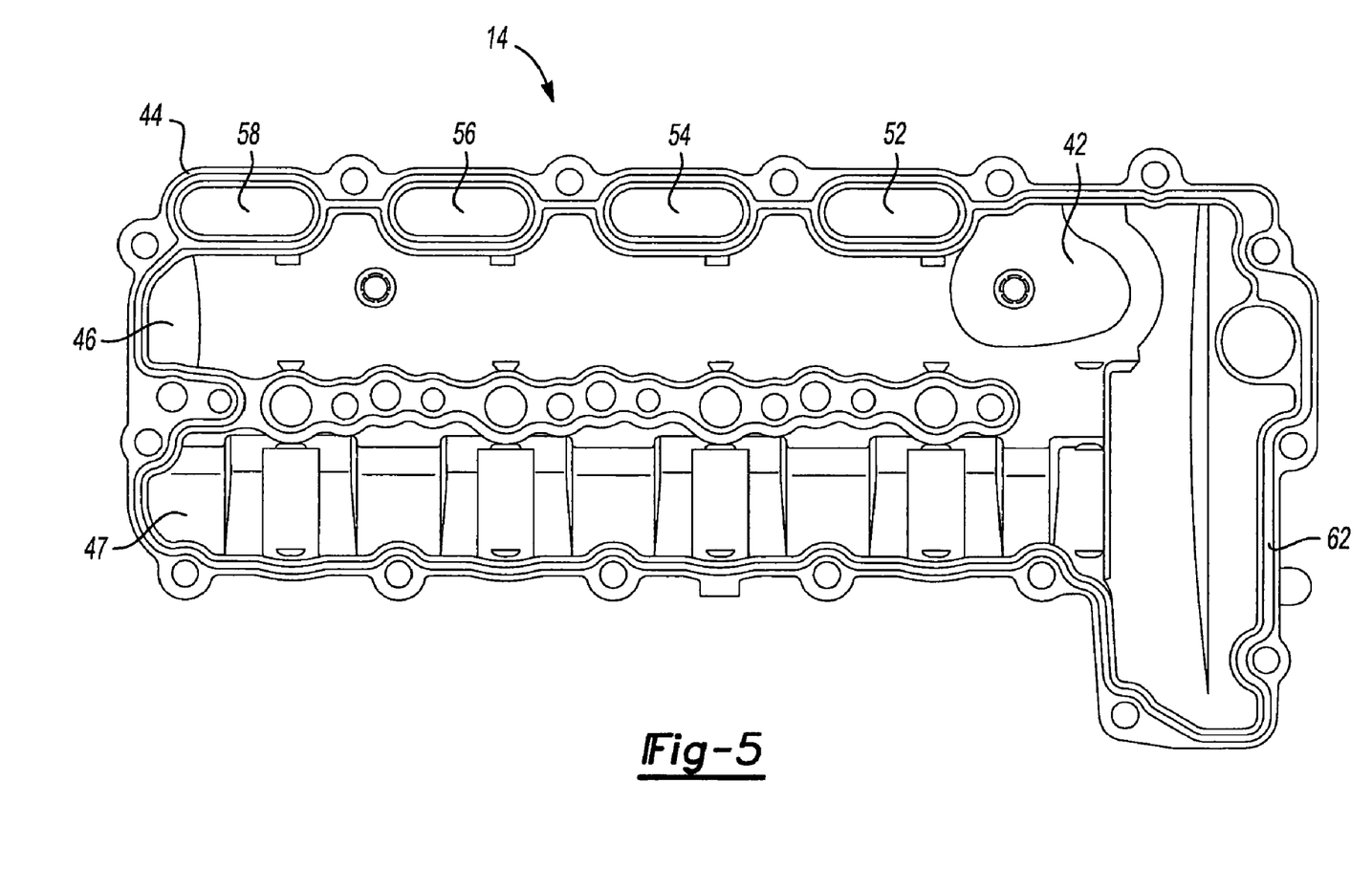
FIG. 5 is a bottom plan view of the cover member of FIG. 4.
Figure 6:
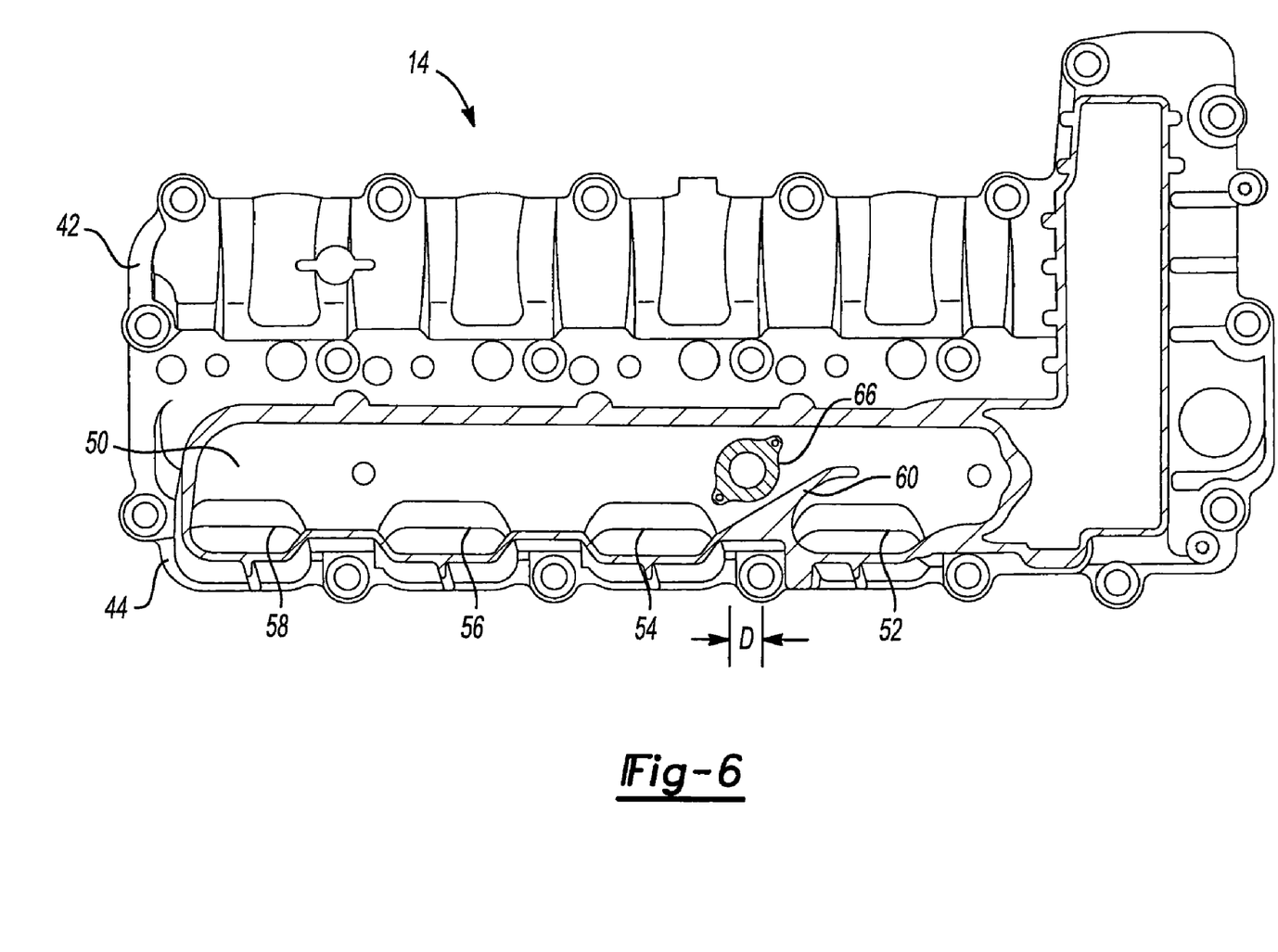
FIG. 6 is a section view of the cover member shown in FIG. 4.

Referring now to FIGS. 1 and 2, an exemplary engine assembly 10 is schematically illustrated. The engine assembly 10 may include an engine 12, first and second cover members 14, 15, an air intake plenum 16, and an exhaust manifold 18. The engine 12 may include an engine block 20 having a V-configuration, first and second cylinder heads 22, 24, and a valvetrain assembly 26. The engine block 20 may include first and second cylinder banks that define first and second sets of cylinders 28, 29 disposed at an angle relative to one another to form the V-configuration. While the present example shows a V-8 application, it is understood that the disclosure applies equally to various other engine configurations having first and second sets of cylinders that are disposed at an angle relative to one another, such as V-6 engines and flat opposed-cylinder engines.

Each of the first and second cylinder heads 22, 24 may include intake ports 30 and exhaust gas ports 32. The intake ports 30 may be located on an outboard side of the each of the first and second cylinder heads 22, 24 and the exhaust gas ports 32 may be located on an inboard side of the each of the first and second cylinder heads 22, 24 and directed toward an inside of the V-configuration. The first and second cover members 14, 15 and the air intake plenum 16 may form an intake system for the engine assembly 10. The air intake plenum 16 may include a first conduit 17 in communication with the first cover member 14 and a second conduit 19 in communication with the second cover member 15.

The valvetrain assembly 26 may include intake and exhaust camshafts 34, 36 and intake and exhaust valves 38, 40. The intake valves 38 may be in communication with the intake ports 30. The exhaust gas ports 32 may provide communication between the exhaust valves 40 and the exhaust manifold 18. While the engine assembly 10 is illustrated as an overhead cam engine, it is understood that the present disclosure may be applicable to a variety of other engine configurations as well including cam-in-block engines.

The first and second cover members 14, 15 may be generally similar to one another. Therefore, the first cover member 14 will be described with the understanding that the description applies equally to the second cover member 15. With additional reference to FIGS. 3-6, the first cover member 14 may include a first portion that forms a cam cover portion 42 and a second portion that forms an intake manifold portion 44 to form an integrated cam cover/intake manifold. The first cover member 14 may be a one-piece part. For example, the first cover member 14 may be a one-piece aluminum part and may be formed from an aluminum casting, such as a semi-permanent aluminum casting.

The cam cover portion 42 may overlie the valvetrain assembly 26 that is located on the first cylinder head 22 and isolate the valvetrain assembly 26 from a location that is external to the engine assembly 10. The cam cover portion 42 may include a first cavity 46 that covers the intake camshaft 34 and the intake valves 38 and a second cavity 47 that covers the exhaust camshaft 36 and the exhaust valves 40. The intake manifold portion 44 may form an intake manifold and may include an air inlet 48, an air distribution member 50, an acoustic tuning mechanism 51, and intake manifold ports 52, 54, 56, 58. The air inlet 48 may be in communication with the air intake plenum 16 and the air distribution member 50. The air distribution member 50 may define a cavity that is in communication with the air inlet 48 and the intake manifold ports 52, 54, 56, 58.

The air distribution member 50 may include features to provide a desired air flow condition to the intake manifold ports 52, 54, 56, 58. For example, a rib 60 may be located within the air distribution member 50 and may extend into the cavity near the manifold port 52 that is closest to the air inlet 48 in order to direct air flow and provide even air distribution between the manifold ports 52, 54, 56, 58. The intake manifold ports 52, 54, 56, 58 may each be in communication with one of the intake ports 30 in the first cylinder head 22. The intake manifold portion 44 may be isolated from the cam cover portion 42 through the use of a gasket (not shown) located within the channel 62 on the lower surface of the first cover member 14 to provide sealed communication between the intake manifold ports 52, 54, 56, 58 and the intake ports 30.

The acoustic tuning mechanism 51 may be in communication with the cavity defined by the air distribution member 50 via an opening 64 in a wall of the air distribution member 50. In the present example, the acoustic tuning mechanism 51 may be in the form of a Helmholtz resonator. However, it is understood that the present disclosure is not limited to a Helmholtz resonator and that the acoustic tuning mechanism 51 may alternatively include a variety of tuning devices such as side branches, pinch cans, and expansion chambers.

The acoustic tuning mechanism 51 may include a conduit 66 and a chamber 68 that defines a volume. The conduit 66 may be fixed to the air distribution member 50 and in communication with the cavity defined by the air distribution member 50 through the opening 64. The conduit 66 may have a length (L) and a diameter (D). Alternatively, the chamber 68 may be directly in communication with the air distribution member 50. In such an arrangement, the conduit 66 may be eliminated (or have an effective length (L) of zero). The chamber 68 may have a width (W) that is greater than the diameter (D) of the conduit 66. The conduit 66 may generally form an air flow restriction between the cavity of the air distribution member 50 and the chamber 68.

The second cover member 15 may additionally include an acoustic tuning mechanism 53. The acoustic tuning mechanism 51 may be designed based on air pressure pulsations within the intake manifold portion 44 of the first cover member 14. For example, the acoustic tuning mechanism 51 may be designed based on the frequency and the amplitude of the air pressure pulsations within the intake manifold portion 44. The air pressure pulsations corresponding to the second set of cylinders 29 may be compensated for by the acoustic tuning mechanism 53 of the second cover member 15 in a manner similar to that described for the first cover member 14. The air pressure pulsations may be generated in a variety of ways including periodic and a-periodic events, as well as intake manifold geometry.

For example, the air pressure pulsations may be generated by a first a-periodic firing order of the first set of cylinders 28 associated with the first cover member 14. The first a-periodic firing order may repeat every two crankshaft revolutions. The second set of cylinders 29 may additionally generate a second a-periodic firing order. The second a-periodic firing order may repeat with the first a-periodic firing order every two crankshaft revolutions. While described as having a-periodic firing orders in the present disclosure, it is understood that the first and second cover members 14, 15 are applicable to sets of cylinders that each have a periodic firing order for every two crankshaft revolutions. The first and second a-periodic firing orders may be different from one another. Since the first and second a-periodic firing orders may be different, the pressure pulsations generated within the first and second cover members 14, 15 may also be different. The acoustic tuning mechanisms 51, 53 may be designed independent from one another to account for the respective pressure pulsations within the first and second cover members 14, 15 and may therefore be different from one another.

The configuration of the first cover member 14 may also be applicable to in-line engines having an a-periodic firing order. For example, an in-line engine that includes a cylinder deactivation system may have an a-periodic firing order during a cylinder deactivation mode. A cover member that is similar to the first cover member 14 may be used on the in-line engine configuration to account for pressure pulsations that are generated by the a-periodic firing of cylinders during operation in the cylinder deactivation mode.

In the present example, the first set of cylinders 28 may include first, second, third, and fourth cylinders 70, 72, 74, 76 and the second set of cylinders 29 may include fifth, sixth, seventh, and eighth cylinders 78, 80, 82, 84. The firing order of the cylinders 28, 29 corresponding to two crankshaft revolutions may be as follows: first cylinder 70, fifth cylinder 78, fourth cylinder 76, eighth cylinder 84, sixth cylinder 80, third cylinder 74, seventh cylinder 82, second cylinder 72. In the present example, the engine 12 is shown as an eight cylinder engine. Therefore, the interval between cylinder firings is ninety (90) degrees of crankshaft rotation.

Based on firing order described above, the firing order for the first set of cylinders 28 is: first cylinder 70, fourth cylinder 76, third cylinder 74, second cylinder 72, with one hundred and eighty (180) degrees of crankshaft rotation between the firing of the first and fourth cylinders 70, 76, two hundred and seventy (270) degrees between the firing of the fourth and third cylinders 76, 74, one hundred and eighty (180) degrees between the firing of the third and second cylinders 74, 72, and ninety (90) degrees between the firing of the second and first cylinders 72, 70. These a-periodic firing events may produce an exaggerated air pressure pulsation in the intake manifold portion 44 of the first cover member 14. In the present example, the exaggerated air pressure pulsation may include a low frequency pulsation having a frequency of 1.5 pulsations/revolution. As can be seen from the firing order described above, the second set of cylinders 29 may additionally produce a-periodic firing events that result in exaggerated air pressure pulsation in the second cover member 15. For simplicity, the second set of cylinders 29 and the second cover member 15 are not discussed in detail with the understanding the discussion of the first set of cylinders and the first cover member 14 generally applies to the second set of cylinders 29 and the second cover member 15.

As indicated above, the acoustic tuning mechanism 51 may be designed to account for the pressure pulsations generated by the a-periodic firing frequency of the first set of cylinders. For example, the type of tuning device used may be selected based on the amplitude and frequency of the pressure pulsations. Additionally, the components of a specific type of tuning device may be sized based on the pressure pulsations. In the present example, the length (L) and diameter (D) of the conduit 66 may be modified and the ratio between the diameter (D) of the conduit 66 and the width (W) of the chamber 68 may be modified. The volume (V) of the chamber 68 may also be modified to account for a specific pressure pulsation frequency.

Accordingly, a method of tuning the intake system of the engine assembly 10 may include first determining the first air pressure pulsation in the first intake manifold portion 44 of the first cover member 14. The determination may also include a determination of a frequency of the first air pressure pulsation. The determined first air pressure pulsation may be based on the a-periodic firing order of the first set of cylinders 28. An acoustic tuning mechanism 51 may be selected based on the determined first air pressure pulsation. The first cover member 14 may then be assembled to provide communication between the first intake manifold portion 44 and the acoustic tuning mechanism 51 to reduce the first air pressure pulsation within the air distribution member 50. The reduction in air pressure pulsation within the air distribution member 50 may additionally reduce the variation in air flow between each of the first set of cylinders 28.

As repeated throughout the application, a similar method may be applied to the second cover member 15 and the second set of cylinders 29. Specifically, a second air pressure pulsation in the second intake manifold formed by the second cover member 15 based on the second a-periodic cylinder firing of the second set of cylinders 29 may be determined. An acoustic tuning device 53 may be selected based on the determined second air pressure pulsation and the second cover member 15 may then be assembled to provide communication between the second intake manifold formed by the second cover member 15 and the acoustic tuning device 53 to reduce the second air pressure pulsation.

What is claimed is:

1. An engine assembly comprising:
    an engine block including a first bank defining a first set of cylinders and a second bank defining a second set of cylinders;
    a first cylinder head fixed to the first bank and including a first set of intake ports;
    a second cylinder head fixed to the second bank and including a second set of intake ports;
    a first cylinder head cover defining a first intake manifold fixed to the first cylinder head and including a first air inlet, a first air distribution member defining a cavity in communication with the first air inlet, and a first set of intake manifold ports extending from the first air distribution member and providing communication between the first air distribution member and the first set of intake ports, and a first acoustic tuning mechanism extending from and in communication with the first air distribution member that reduces a first air pressure pulsation within the first air distribution member; and
    a second cylinder head cover defining a second intake manifold fixed to the second cylinder head and including a second air inlet, a second air distribution member defining a cavity in communication with the second air inlet, and a second set of intake manifold ports extending from the second air distribution member and providing communication between the second air distribution member and the second set of intake ports, and a second acoustic tuning mechanism extending from and in communication with the second air distribution member that reduces a second air pressure pulsation within the second air distribution member.

2. The engine assembly of claim 1, wherein the first acoustic tuning mechanism includes a chamber in communication with the first air distribution member.

3. The engine assembly of claim 2, wherein the first acoustic tuning mechanism includes a conduit providing communication between the chamber and the first air distribution member.

4. The engine assembly of claim 3, wherein the first acoustic tuning mechanism includes a Helmholtz resonator.

5. The engine assembly of claim 1, wherein the second set of cylinders is disposed at an angle relative to the first set of cylinders to form a V-configuration, the first cylinder head including a first set of exhaust ports located on an inboard side of the cylinder head proximate a center of the V-configuration.

6. The engine assembly of claim 5, wherein the first set of cylinders has a first a-periodic firing order corresponding to two revolutions of a crankshaft of the engine that generates the first air pressure pulsation, the second set of cylinders having a second a-periodic firing order that corresponds to the two revolutions of the crankshaft that generates the second air pressure pulsation.

7. The engine assembly of claim 1, wherein the first set of cylinders has a first a-periodic firing order corresponding to two revolutions of a crankshaft of the engine that generates the first air pressure pulsation.

8. An engine assembly comprising:
    an engine block including a first bank defining a first set of cylinders having a first a-periodic firing order corresponding to two revolutions of an engine crankshaft;
    a first cylinder head fixed to the first bank and including a first set of intake ports; and
    a first cylinder head cover defining a first intake manifold fixed to the first cylinder head and including a first air inlet, a first air distribution member defining a cavity in communication with the first air inlet, and a first set of intake manifold ports extending from the first air distribution member and providing communication between the first air inlet and the first set of intake ports, and a first acoustic tuning mechanism extending from and in communication with the first air distribution member that reduces a first air pressure pulsation created by the first a-periodic firing order of the first set of cylinders.

9. The engine assembly of claim 8, wherein the first acoustic tuning mechanism includes a chamber in communication with the first air distribution member.

10. The engine assembly of claim 9, wherein the first acoustic tuning mechanism includes a conduit providing communication between the chamber and the first air distribution member.

11. The engine assembly of claim 10, wherein the first acoustic tuning mechanism includes a Helmholtz resonator.

12. The engine assembly of claim 8, wherein the engine block includes a second bank defining a second set of cylinders that are disposed at an angle relative to the first set of cylinders.

13. The engine assembly of claim 12, wherein the second set of cylinders has a second a-periodic firing order corresponding to the two revolutions of the crankshaft that generates a second air pressure pulsation.

14. The engine assembly of claim 13, further comprising a second cylinder head and a second cylinder head cover, the second cylinder head being fixed to the second bank and including a second set of intake ports, the second cylinder head cover defining a second intake manifold including a second air inlet, a second air distribution member defining a cavity in communication with the second air inlet and the second set of intake ports, and a second set of intake manifold ports extending from the second air distribution member and providing communication between the second air inlet and the second set of intake ports, and a second acoustic tuning mechanism extending from and in communication with the second air distribution member that reduces a second air pressure pulsation within the second air distribution member.

15. The engine assembly of claim 13, wherein the first a-periodic firing order is different from the second a-periodic firing order.

16. A method comprising:
 determining a first air pressure pulsation in a first intake manifold defined by a first cylinder head cover that is fixed to a first cylinder head that corresponds to a first set of cylinders in an engine, the first cylinder head cover including a first air inlet, a first air distribution member defining a cavity in communication with the first air inlet, and a first set of intake manifold ports extending from the first air distribution member and providing communication between the first air distribution member and a first set of intake ports in the first cylinder head;
 determining a second air pressure pulsation in a second intake manifold defined by a second cylinder head cover that is fixed to a second cylinder head that corresponds to a second set of cylinders of the engine, the second cylinder head cover including a second air inlet, a second air distribution member defining a cavity in communication with the second air inlet, and a second set of intake manifold ports extending from the second air distribution member and providing communication between the second air distribution member and a second set of intake ports in the second cylinder head;
 selecting a first acoustic tuning mechanism based on the determined first air pressure pulsation;
 providing communication between the first intake manifold and the first acoustic tuning mechanism to reduce the first air pressure pulsation;
 selecting a second acoustic tuning mechanism based on the determined second air pressure pulsation; and
 providing communication between the second intake manifold and the second acoustic tuning mechanism to reduce the second air pressure pulsation.

17. The method of claim 16, wherein the providing communication between the first intake manifold and the first acoustic tuning mechanism reduces a variation in air flow to each of the cylinders in the first set of cylinders.

18. The method of claim 16, wherein the determining the first air pressure pulsation includes determining a first frequency of the first air pressure pulsation within the first intake manifold and the determining the second air pressure pulsation includes determining a second frequency of the second air pressure pulsation within the second intake manifold.

19. The method of claim 16, wherein the determining the first air pressure pulsation includes determining a first amplitude of the first air pressure pulsation within the first intake manifold and the determining the second air pressure pulsation includes determining a second amplitude of the second air pressure pulsation within the second intake manifold.

20. The method of claim 16, wherein the first set of cylinders is disposed at an angle relative to the second set of cylinders to form a V-configuration.

* * * * *